(12) United States Patent
Kwon et al.

(10) Patent No.: US 12,405,106 B2
(45) Date of Patent: Sep. 2, 2025

(54) DEVICE AND METHOD FOR MEASURING THICKNESS

(71) Applicant: Samsung Display Co., LTD., Yongin-si (KR)

(72) Inventors: Ohjune Kwon, Yongin-si (KR); Jinho Hyun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 191 days.

(21) Appl. No.: 18/457,548

(22) Filed: Aug. 29, 2023

(65) Prior Publication Data

US 2024/0159515 A1    May 16, 2024

(30) Foreign Application Priority Data

Nov. 16, 2022   (KR) .................. KR10-2022-0153956

(51) Int. Cl.
  G01B 11/02  (2006.01)
  G01B 11/06  (2006.01)
  G01B 11/03  (2006.01)
(52) U.S. Cl.
  CPC ............ G01B 11/06 (2013.01); *G01B 11/022* (2013.01); *G01B 11/03* (2013.01)
(58) Field of Classification Search
  CPC ....... G01B 11/06; G01B 11/022; G01B 11/03; G06T 7/50
  USPC ....... 356/630, 503, 485, 908, 355, 357, 384, 356/381
  See application file for complete search history.

(56) References Cited

U.S. PATENT DOCUMENTS

| | | | | |
|---|---|---|---|---|
| 3,824,017 A | * | 7/1974 | Galyon .............. | G01B 11/0641 356/504 |
| 4,555,767 A | * | 11/1985 | Case .................. | G01B 11/0625 250/341.4 |
| 4,707,611 A | * | 11/1987 | Southwell ............. | G02B 5/289 250/559.28 |
| 4,984,894 A | * | 1/1991 | Kondo .............. | G01B 11/0625 356/504 |
| 4,999,509 A | * | 3/1991 | Wada ................. | G01B 11/0625 250/559.27 |
| 5,604,581 A | * | 2/1997 | Liu .................... | G01B 11/0625 356/73 |
| 6,166,819 A | * | 12/2000 | Schnabel ........... | G01B 11/0675 356/504 |

(Continued)

FOREIGN PATENT DOCUMENTS

KR    20060100531 A    9/2006
KR    101366873 B1    2/2014

*Primary Examiner* — Isiaka O Akanbi
(74) *Attorney, Agent, or Firm* — CANTOR COLBURN LLP

(57) ABSTRACT

A thickness measuring device includes an imaging unit disposed above an inspection substrate, which includes a substrate, a pattern provided on the substrate, and an inspection layer disposed on the pattern. The imaging unit images the inspection substrate to output inspection image data and a data calculating unit receives the inspection image data and calculates a thickness value of the inspection layer from the inspection image data, wherein the imaging unit is disposed inclined at a fixed angle with respect to the inspection substrate, and wherein the data calculating unit calculates the thickness value of the inspection layer using a coordinate value of the pattern from the inspection image data.

20 Claims, 14 Drawing Sheets

(56) References Cited

U.S. PATENT DOCUMENTS

| | | | |
|---|---|---|---|
| 6,392,756 B1* | 5/2002 | Li | G01B 11/0641 356/504 |
| 6,501,545 B2* | 12/2002 | Komuro | H01L 22/26 257/E21.53 |
| 6,573,999 B1* | 6/2003 | Yang | G01B 11/0625 356/630 |
| 7,636,168 B2 | 12/2009 | De Lega et al. | |
| 9,068,819 B2* | 6/2015 | Kubota | G01B 11/06 |
| 2004/0105101 A1* | 6/2004 | Shinya | G01B 11/0675 356/630 |
| 2007/0121124 A1* | 5/2007 | Nabatova-Gabain | G01B 11/0641 356/630 |
| 2008/0068619 A1* | 3/2008 | Vial | B60R 16/0237 356/630 |
| 2015/0300809 A1* | 10/2015 | Kononchuk | H01L 22/12 356/630 |
| 2016/0061583 A1* | 3/2016 | Ryu | G01B 11/0633 356/630 |

* cited by examiner

DEVICE AND METHOD FOR MEASURING THICKNESS

This application claims priority to Korean Patent Application No. 10-2022-0153956, filed on Nov. 16, 2022, and all the benefits accruing therefrom under 35 U.S.C. § 119, the content of which in its entirety is herein incorporated by reference.

BACKGROUND

(1) Field

The present disclosure herein relates to a thickness measuring device and a method for measuring thickness with an improved reliability of thickness measurement.

(2) Description of the Related Art

An electronic device such as a smartphone, a digital camera, a notebook computer, a navigation device and/or a smart television, which provides a user with an image, includes a display device for displaying the image. The display device generates the image and provides the user with the image through a display screen.

An adhesive for attaching a film or the like to a display panel may be disposed on the display panel. According to the thickness of the adhesive, a bonding defect may occur, and thus it is necessary to precisely measure the thickness of the adhesive.

SUMMARY

The present disclosure provides a thickness measuring device with an improved reliability of thickness measurement. The present disclosure also provides a method for measuring a thickness of a portion of a display device by using the thickness measuring device with an improved reliability of thickness measurement.

An embodiment of the invention provides a thickness measuring device including an imaging unit, which is disposed above an inspection substrate including a substrate, a pattern provided on the substrate, and an inspection layer disposed on the pattern, wherein the imaging unit image the inspection substrate and outputs inspection image data, and a data calculating unit which receives the inspection image data and calculates a thickness value of the inspection layer from the inspection image data.

In an embodiment, the imaging unit may be disposed inclined at a fixed angle with respect to the inspection substrate, and the data calculating unit may calculate the thickness value of the inspection layer using a coordinate value of the pattern from the inspection image data.

In an embodiment, the inspection layer may include first to fourth side surfaces, and at least one of the first to fourth side surfaces may have an inclined surface that is inclined in a direction away from a center of the inspection layer.

In an embodiment, the pattern may overlap the at least one of the first to fourth side surfaces.

In an embodiment, the inspection layer may include first to fourth corner portions, and at least one of the first to fourth corner portions may have an inclined surface that is inclined in a direction away from a center of the inspection layer.

In an embodiment, the pattern may overlap the at least one of the first to fourth corner portions.

In an embodiment, the inspection layer may be made of a transparent material.

In an embodiment, the pattern may be provided in plurality.

In an embodiment, the plurality of patterns may have different shapes.

In an embodiment, the pattern may overlap a central portion of the inspection layer.

In an embodiment, the inspection layer may overlap a portion of the substrate.

In an embodiment, the pattern may include a first pattern portion overlapping the inspection layer, and a second pattern portion non-overlapping the inspection layer.

In an embodiment, the first pattern portion may extend from the second pattern portion.

In an embodiment, the data calculating unit may calculate the thickness value of the inspection layer from a first coordinate value of the pattern when the inspection layer is absent, and a second coordinate value of the pattern when the inspection layer is present.

In an embodiment, the data calculating unit may calculate a thickness of the inspection layer from the following equation:

$$t = \frac{d}{\sin\theta 1 \left[1 - \dfrac{\cos\theta 1}{\sqrt{n1^2 - \sin^2\theta 1}}\right]}, \qquad \text{[Equation 1]}$$

where t is the thickness of the inspection layer, d is a light path difference corresponding to a difference between the first coordinate value and the second coordinate value, θ1 is an imaging angle, and $n_1$ is a refractive index of the inspection layer.

In an embodiment of the invention, a thickness measuring method includes providing a substrate, forming a pattern on the substrate, disposing an inspection layer on the substrate so as to partially overlap the pattern on a plan view, imaging the pattern to output inspection image data by an imaging unit, and receiving the inspection image data and calculating a thickness value of the inspection layer from the inspection image data by a data calculating unit. The imaging unit is disposed inclined at a fixed angle with respect to the substrate.

In an embodiment, in the calculating of the thickness value of the inspection layer, a first coordinate value of the pattern when the inspection layer is absent, and a second coordinate value of the pattern when the inspection layer is present, may be extracted from the inspection image data, and the thickness value of the inspection layer may be calculated from the first coordinate value and the second coordinate value by the data calculating unit.

In an embodiment, the extracting of the second coordinate value may include processing for extracting the second coordinate from the first coordinate value.

In an embodiment, in the calculating of the thickness value of the inspection layer, the thickness value of the inspection layer may be calculated from the following equation:

$$t = \frac{d}{\sin\theta 1 \left[1 - \dfrac{\cos\theta 1}{\sqrt{n1^2 - \sin^2\theta 1}}\right]}, \qquad \text{[Equation 1]}$$

where t is the thickness of the inspection layer, d is a light path difference corresponding a difference between the first coordinate value and the second coordinate value, θ1 is an imaging angle, and $n_1$ is a refractive index of the inspection layer.

In an embodiment, the thickness measuring method may further include preliminarily imaging the pattern before the disposing of the inspection layer.

In an embodiment, the calculating of the thickness value of the inspection layer may include comparing preliminary inspection image data obtained from the preliminarily imaging with inspection image data imaged after the disposing the inspection layer to calculate the thickness value of the inspection layer.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
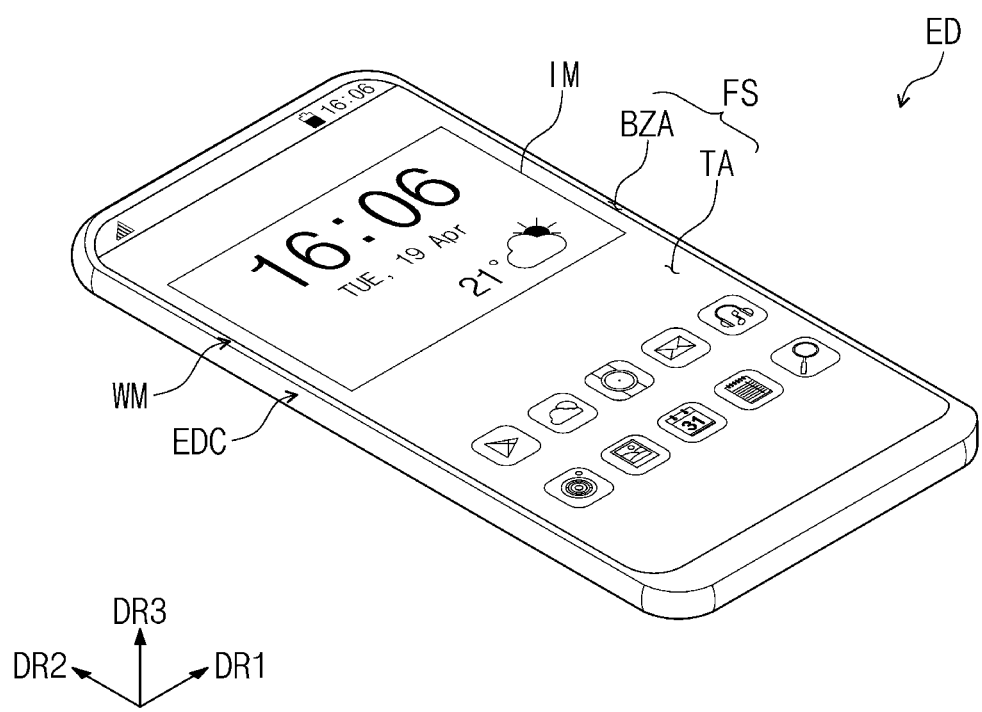
FIG. 1 is a perspective view of an electronic device according to an embodiment.

Embodiments of the invention will be described below in more detail with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art.

It will be understood that when an element (or region, layer, section, etc.) is referred to as being related to another element such as being "on", "connected to" or "coupled to" another element, the element can be disposed directly on, connected or coupled to the other element or a third intervening elements may be disposed between the elements.

Like reference numbers or symbols refer to like elements throughout. In addition, in the drawings, the thickness, the ratio, and the dimension of elements are exaggerated for effective description of the technical contents.

The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element.

The terminology used herein is for the purpose of describing particular embodiments only and is not intended to be limiting. As used herein, "a", "an," "the," and "at least one" do not denote a limitation of quantity, and are intended to include the plural forms as well, unless the context clearly indicates otherwise. Within the Figures and the text of the disclosure, a reference number indicating a singular form of an element may also be used to reference a plurality of the singular element.

In addition, the terms, such as "below", "beneath", "on" and "above", are used for explaining the relation of elements shown in the drawings. The terms are used as a relative concept and are described based on the direction shown in the drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms, such as "includes" and "has", when used herein, specify the presence of stated features, numerals, steps, operations, elements, parts, or the combination thereof, but do not preclude the presence or addition of one or more other features, numerals, steps, operations, elements, parts, or the combination thereof.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, embodiments of the invention will be described with reference to the accompanying drawings.

Figure 2:
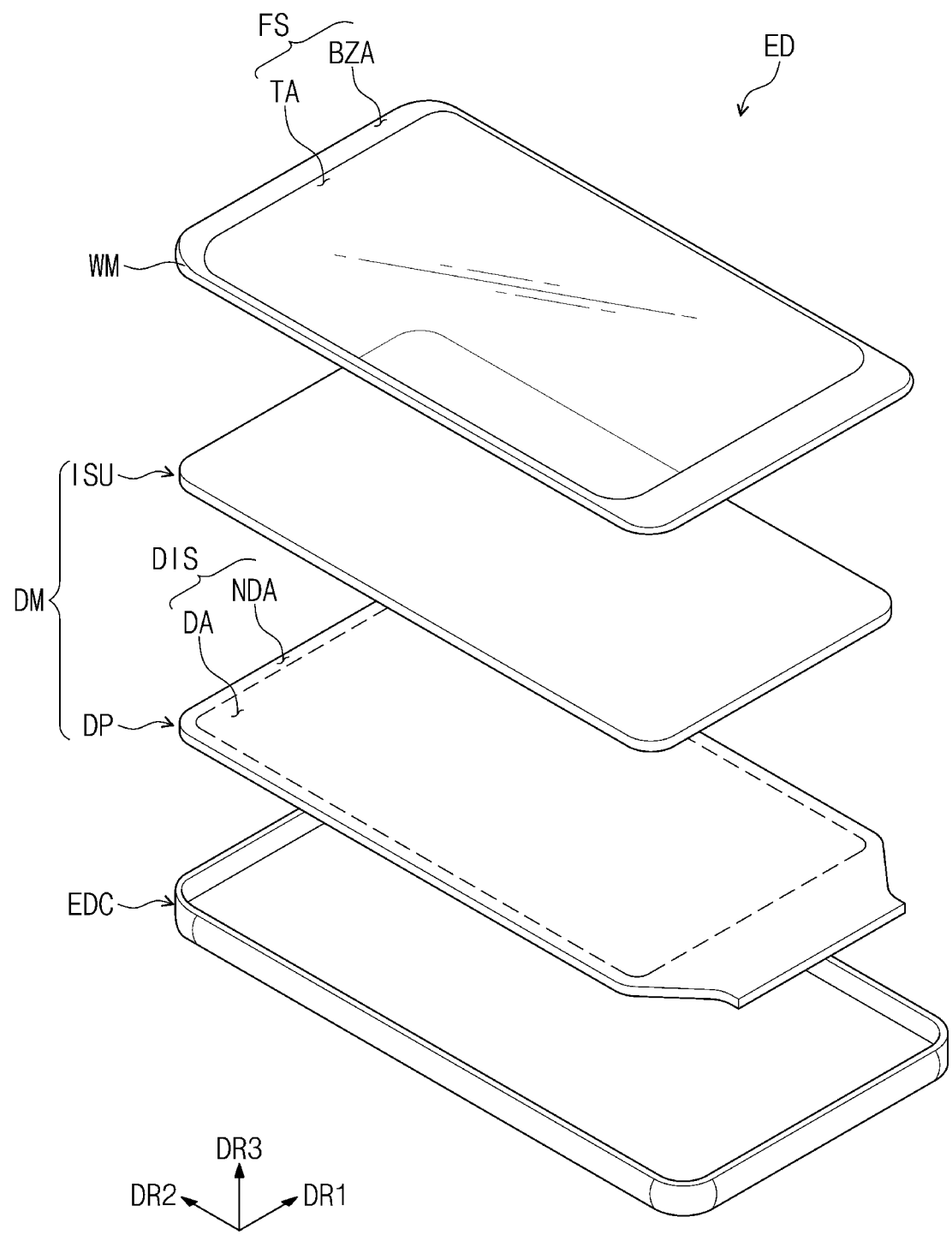
FIG. 2 is an exploded perspective view of an electronic device according to an embodiment.
Figure 3:
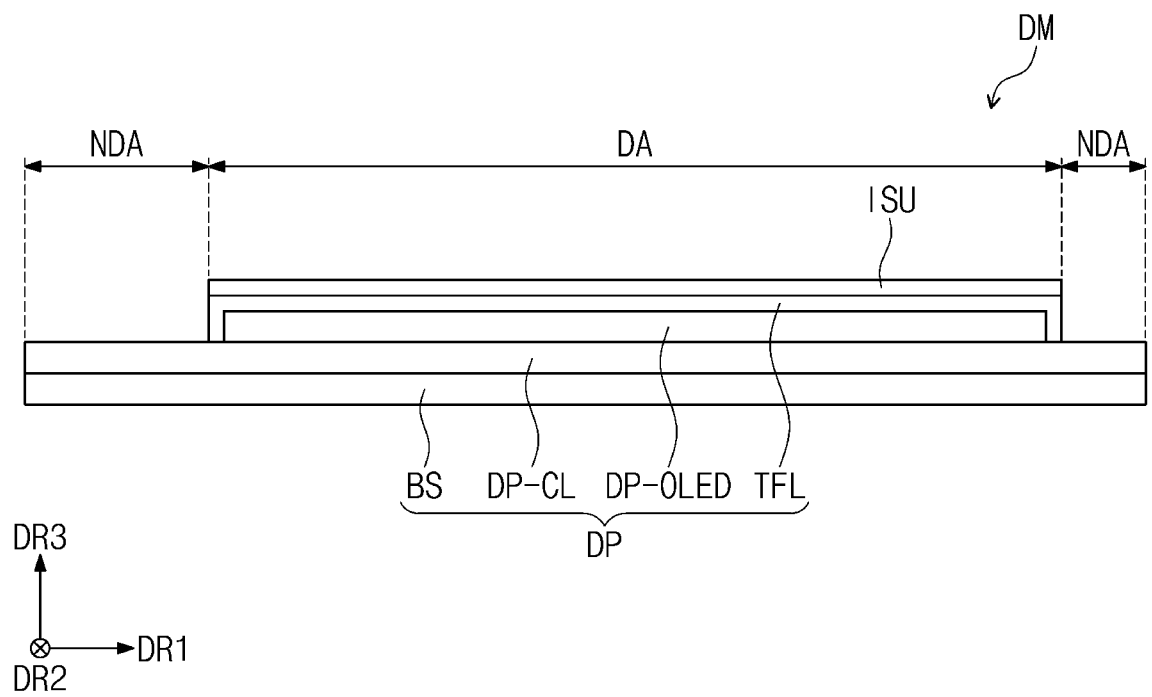
FIG. 3 is a cross-sectional view of a display module according to an embodiment.

FIG. 1 is a perspective view of an electronic device according to an embodiment. FIG. 2 is an exploded perspective view of an electronic device according to an embodiment. FIG. 3 is a cross-sectional view of a display module according to an embodiment.

Referring to FIG. 1, in an embodiment, an electronic device ED may be a device that is activated in response to an electrical signal and that displays an image. For example, the electronic device ED may be a large-sized device such as a television or an outdoor billboard, and/or may also be a small and medium-sized device such as a monitor, a mobile phone, a tablet computer, a navigation device, or a game console. However, the embodiments of the electronic device ED are examples, and the electronic device ED is not limited to any one of the above. In this embodiment, a mobile phone is illustrated as an example of the electronic device ED.

In an embodiment, the electronic device ED may have a rectangular shape with short sides extending in a first direction DR1 and long sides extending in a second direction DR2 crossing the first direction DR1. However, an embodiment is not limited thereto, and the electronic device ED may have various shapes such as a circular shape or a polygon shape.

The electronic device ED according to an embodiment may have a flexible characteristic. The term "flexible" refers to a bendable characteristic, and may include all from a fully folded structure to a structure capable of bending at the level of several nanometers. For example, the flexible electronic device ED may include a curved device and/or a foldable device. However, an embodiment is not limited thereto, and the electronic device ED may have a rigid characteristic.

In an embodiment, the electronic device ED may display an image IM in a third direction DR3 on a display surface that has a direction that is parallel to each of the first direction DR1 and the second direction DR2. The image IM provided by the electronic device ED may include not only a dynamic image but also a still image. FIG. 1 illustrates a clock window and icons as an example of the image IM.

In an embodiment, the display surface on which the image IM is displayed may correspond to a front surface of the electronic device ED. In FIG. 1, a display surface having a plane shape is illustrated as an example. However, an embodiment is not limited thereto, and the display surface of the electronic device ED may include a curved surface bent from at least one side of a plane.

In an embodiment, a front surface (or top surface) and a rear surface (or bottom surface) constituting the electronic device ED may oppose each other in the third direction DR3, and a normal direction to each of the front surface and the rear surface may be substantially parallel to the third direction DR3. A spaced distance between the front surface and the rear surface, which is defined in the third direction DR3, may correspond to the thickness of the member (or unit).

In an embodiment, referring to FIGS. 1 and 2, the electronic device ED may include a window WM, a display module DM, and a case EDC. The window WM may be coupled to the case EDC to constitute an outer appearance of the electronic device ED, and may provide an inner space capable of accommodating components of the electronic device ED.

In an embodiment, the window WM may be disposed on the display module DM. The window WM may have a shape corresponding to the shape of the display module DM. The window WM may cover the entire outside of the display module DM, and may protect the display module DM from external impacts and scratches.

In an embodiment, the window WM may include an optically clear insulating material. For example, the window WM may include a glass substrate and/or a polymer substrate. The window WM may have a single-layer and/or a multilayer structure. The window WM may further include functional layers such as an anti-fingerprint layer, a phase control layer, and/or a hard coating layer, which may be disposed on a transparent substrate.

In an embodiment, a front surface FS of the window WM may include a transmission region TA and a bezel region BZA. The transmission region TA of the window WM may be an optically clear region. The window WM may transmit the image IM provided by the display module DM through the transmission region TA, and the image IM may be visible to a user.

In an embodiment, the bezel region BZA of the window WM may be provided as a region printed with a material having a predetermined color. The bezel region BZA of the window WM may prevent one component of the display module DM, which is disposed overlapping the bezel region BZA, from being externally visible.

In an embodiment, the bezel region BZA may be adjacent to the transmission region TA. The shape of the transmission region TA may be defined substantially by the bezel region BZA. For example, in an embodiment, the bezel region BZA may be disposed outside the transmission region TA to surround the transmission region TA. However, this is illustrated as an example, and in other embodiments, the bezel region BZA may be adjacent only to one side of the transmission region TA or may be omitted. In still yet other embodiments, the bezel region BZA may be disposed on an inner side surface of the electronic device ED, not on the front surface.

In an embodiment, the display module DM may be disposed between the window WM and the case EDC, where the display module DM may include a display panel DP and/or an input sensor ISU.

The display panel DP may display the image IM in response to an electrical signal. The display panel DP according to an embodiment may be a light emitting display panel, but is not limited thereto. For example, the display panel DP may be an organic light emitting display panel, an inorganic light emitting display panel, or a quantum dot light emitting display panel. A light emitting layer of the organic electroluminescence display panel may include an organic luminescent material, and a light emitting layer of the inorganic light emitting display panel may include an inorganic luminescent material. A light emitting layer of the quantum dot light emitting display panel may include a quantum dot, a quantum rod, and so on. Hereinafter, the display panel DP is described as the organic light emitting display panel.

In an embodiment, the image IM provided by the electronic device ED may be displayed on a front surface DIS of the display panel DP. The front surface DIS of the display panel DP may include a display region DA and a non-display region NDA. The display region DA may be a region which is activated in response to an electrical signal and in which the image IM is displayed. According to an embodiment, the display region DA of the display panel DP may correspond to the transmission region DA of the window WM.

In the disclosure, a "region/portion corresponds to another region/portion" means that the regions/portions "overlap each other", and is not limited to the regions/portions having the same area and/or the same shape.

In an embodiment, the non-display region NDA may be adjacent to the outside of the display region DA. For example, the non-display region NDA may surround the display region DA, partially or wholly. However, an embodiment of the inventive concept is not limited thereto, and the non-display region NDA may be defined in various shapes.

In an embodiment, the non-display region NDA may be a region in which a driving circuit or driving wiring for driving elements disposed in the display region DA, various signal lines, which provide electrical signals, pads, and so on may be disposed. The non-display region NDA of the display panel DP may correspond to the bezel region BZA of the window WM. Components of the display panel DP, which are disposed in the non-display region NDA, may be prevented from being visible externally by the bezel region BZA.

In an embodiment, referring to FIGS. 2 and 3, the display panel DP may include a base substrate BS, a circuit element layer DP-CL, a display element layer DP-OLED, and/or an insulation layer TFL.

In an embodiment, the base substrate BS may be a glass substrate, a metal substrate, a polymer substrate and/or the like. However, an embodiment is not limited thereto, and the base substrate BS may be an inorganic layer, an organic layer, and/or a composite material layer.

In an embodiment, the circuit element layer DP-CL may be disposed on the base substrate BS. The circuit element layer DP-CL may include at least one intermediate insulation layer and a circuit element. The intermediate insulation layer may include at least one intermediate inorganic film and at least one intermediate organic film. The circuit element may include signal lines, a driving circuit of a pixel, and so on.

In an embodiment, the display element layer DP-OLED may be disposed on the circuit element layer DP-CL. The display element layer DP-OLED may include a plurality of organic light emitting diodes. The display element layer DP-OLED may further include an organic layer such as a pixel defining film.

In an embodiment, the insulation layer TFL may cover the display element layer DP-OLED, where the insulation layer TFL may be a thin film encapsulation layer. The insulation layer TFL may protect the display element layer DP-OLED from moisture, oxygen, and/or foreign matters such as dust particles. However, this is an example, and in other embodiments, an encapsulation substrate may be provided instead of, or in addition to, the insulation layer TFL. In this case, the encapsulation substrate may oppose the base substrate BS, and the circuit element layer DP-CL and the display element layer DP-OLED may be disposed between the encapsulation substrate and the base substrate BS.

In an embodiment, the input sensor ISU may be disposed between the window WM and the display module DP. The input sensor ISU may detect various types of external inputs such as power, pressure, temperature, and light, which are provided from the outside. For example, the input sensor ISU may detect touch by a user's body or pen provided from the outside of the electronic device ED, an input (e.g., hovering) applied by being adjacent to the electronic device ED, and/or the like.

In an embodiment, the case EDC may be disposed below the display panel DP and accommodate the display panel DP. The case EDC may include a glass, plastic, and/or metal material having relatively high rigidity. The case EDC may protect the display panel DP by absorbing an impact applied from the outside and/or preventing permeation of foreign matters/moisture, etc., into the display panel DP.

In an embodiment, the electronic device ED may further include an electronic module including various functional modules for operating the display panel DP, and a power supply module that supplies power necessary for the electronic device ED. For example, the electronic device ED may include a camera module as one example of the electronic module.

Figure 4A:
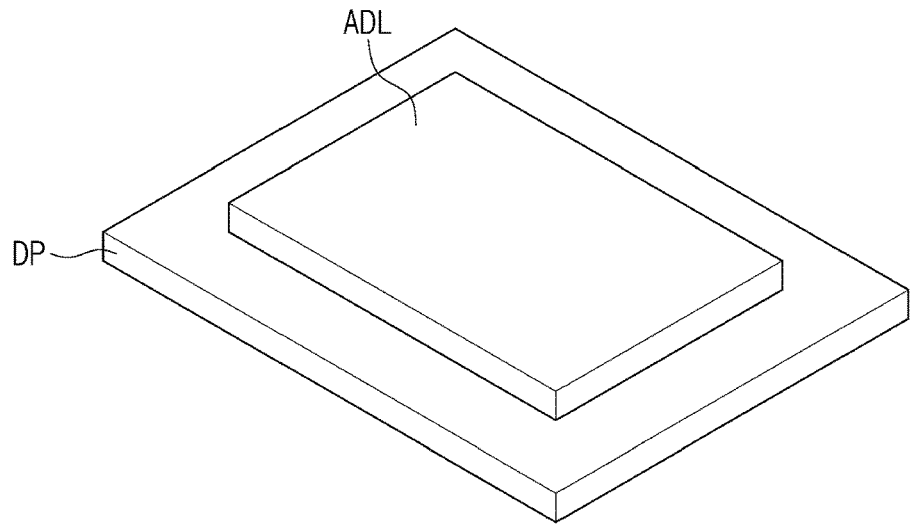
FIG. 4A is a perspective view illustrating a portion of an electronic device according to an embodiment.
Figure 4B:
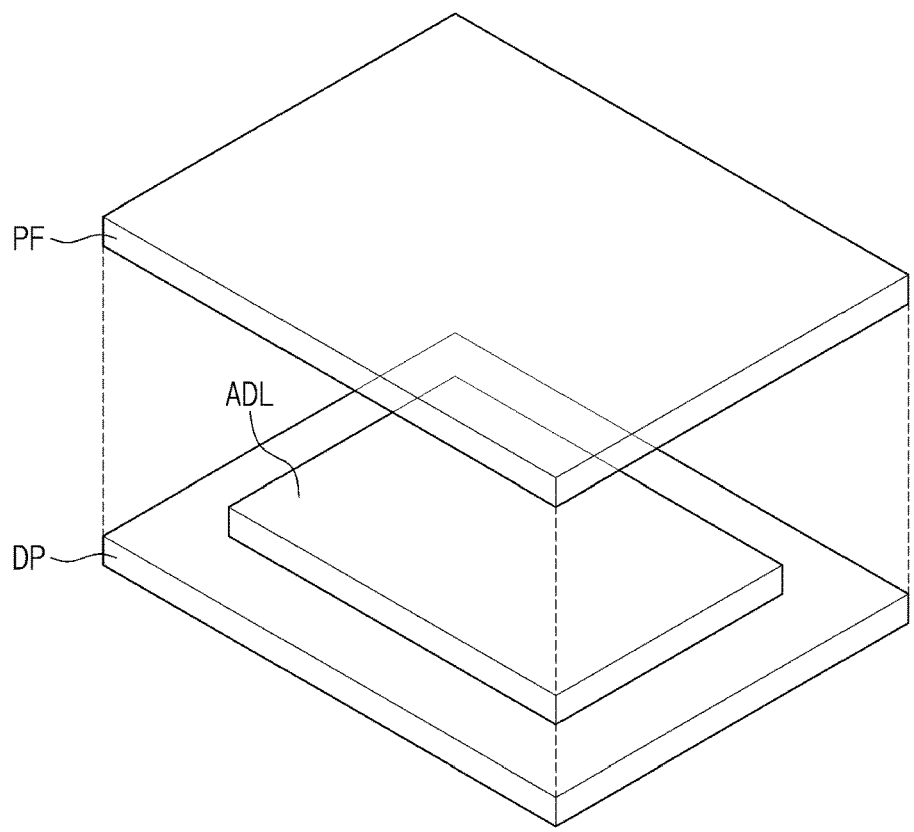
FIG. 4B is a perspective view illustrating a portion of an electronic device according to an embodiment.

FIG. 4A is a perspective view illustrating a portion of an electronic device according to an embodiment. FIG. 4B is a perspective view illustrating a portion of an electronic device according to an embodiment. Specifically, FIGS. 4A and 4B are perspective views illustrating the attachment of a protective film PF, which is not illustrated in FIGS. 1 to 3, to the upper surface of the display panel DP during the manufacture of the display module DM.

In an embodiment, referring to FIGS. 4A and 4B, an adhesive layer ADL may be disposed on the display panel DP. The adhesive layer ADL may be disposed between the display panel DP and the protective film PF in order to attach the protective film PF to the display panel DP for protecting the display element layer DP-OLED (see FIG. 3) included in the display panel DP during the manufacture of the display module DM (see FIG. 3).

In an embodiment, the adhesive layer ADL may be disposed on the display panel DP so as to overlap only a portion of the display panel DP and not the entirety of the display panel DP. However, an embodiment of the invention is not limited thereto, and the adhesive layer ADL may be disposed on the display panel DP and overlap the entirety of the display panel DP so as to cover the entirety of the display panel DP. The adhesive layer ADL may be made of a transparent material. For example, the adhesive layer ADL may be made of a transparent resin such as PC, PMMA, PVC and/or the like, which is a light transmissive material.

In an embodiment, referring to FIG. 4B, the protective film PF may be disposed on the adhesive layer ADL. In order to check whether the adhesive layer ADL disposed on the display panel DP is appropriately applied, an operation of measuring the thickness of the adhesive layer ADL may be performed before the protective film PF is disposed. A thickness measuring device TMD (see FIG. 6) according to an embodiment may measure the thickness of the adhesive layer ADL disposed on the display panel DP. When the thickness of the adhesive layer ADL disposed on the display panel DP is measured and then, a defect is detected from the applied adhesive layer ADL, an additional operation (e.g., an operation of additionally applying the adhesive layer ADL) for solving the defect may be performed.

In an embodiment, the adhesive layer ADL and the protective film PF on the adhesive layer ADL may be removed during the manufacture of the display module DM. After the adhesive layer ADL and the protective film PF on the adhesive layer ADL are removed, the input sensor ISU may be disposed on the display panel DP as illustrated in FIG. 3.

Figure 5A:
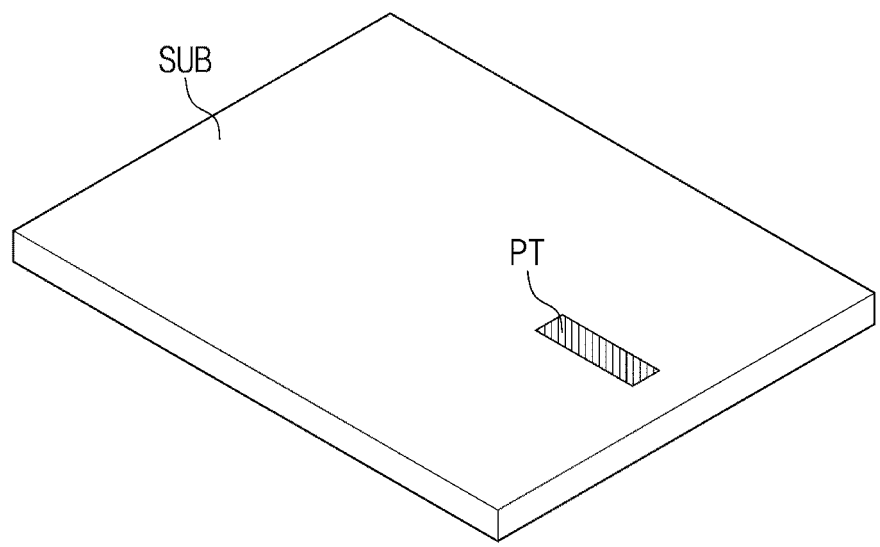
FIG. 5A is a perspective view illustrating a portion of an inspection substrate according to an embodiment.
Figure 5B:
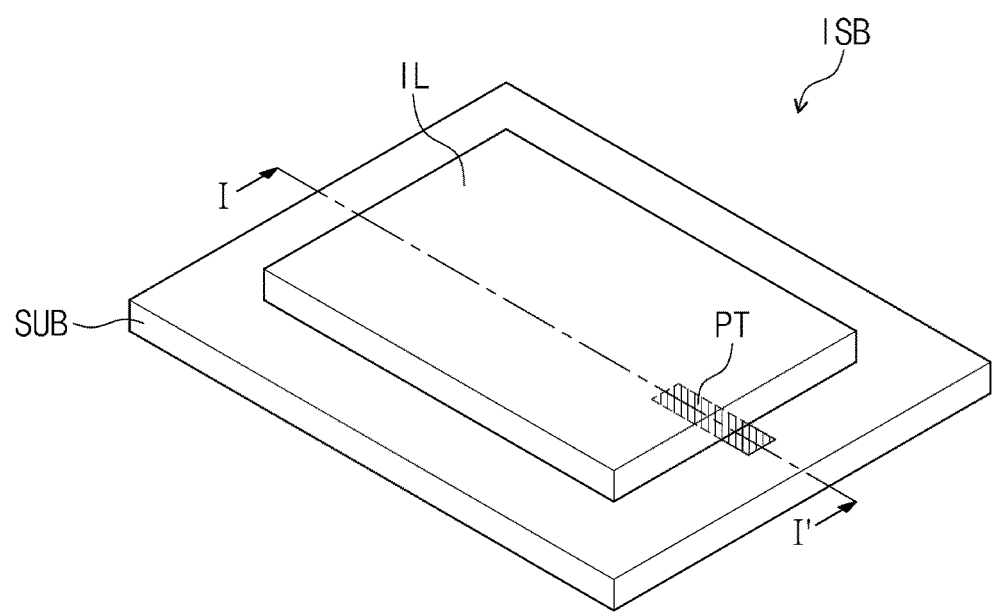
FIG. 5B is a perspective view illustrating an inspection substrate according to an embodiment.

FIG. 5A is a perspective view illustrating a portion of an inspection substrate according to an embodiment. FIG. 5B is a perspective view illustrating an inspection substrate according to an embodiment.

In an embodiment, referring to FIGS. 5A and 5B, an inspection substrate ISB may include a substrate SUB, a pattern PT provided on the substrate SUB, and an inspection layer IL disposed on the substrate SUB. The inspection layer IL may be disposed on the substrate SUB so as to overlap a portion of the substrate SUB.

In an embodiment, the substrate SUB may serve as a support on which the inspection layer IL is provided.

According to an embodiment, the substrate SUB may correspond to the display panel DP (see FIG. 4A) described above. However, an embodiment is not limited thereto, and the substrate SUB may include some of components of the electronic device ED (see FIG. 1). Alternatively, the substrate SUB may be a preliminary display panel in a state before the display panel DP is formed.

In an embodiment, referring to FIG. 5A, the pattern PT may be formed on the substrate SUB before the inspection layer IL is disposed on the substrate SUB. According to that illustrated, the pattern PT may be formed in the form of a bar having a rectangular shape. However, an embodiment is not limited thereto, and the pattern PT may be formed in any shape, such as, for example, a grid shape and/or a circular shape. The pattern PT may be embossed on the substrate SUB. The pattern PT may have a predetermined color. For example, the pattern PT may have a black color.

Referring to FIG. 5B, the inspection layer IL may be disposed on the pattern PT after the pattern PT is formed on the substrate SUB. According to an embodiment, the inspection layer IL may be disposed on the substrate SUB so as to partially overlap the pattern PT. However, an embodiment is not limited thereto, and the inspection layer IL may be disposed to overlap the entirety of the pattern PT. According to an embodiment, the inspection layer IL may correspond to the adhesive layer ADL (see FIG. 4A) described above. However, an embodiment is not limited thereto, and the inspection layer IL may correspond to some of components of the electronic device ED (see FIG. 1), which are provided on the display panel DP.

Figure 6:
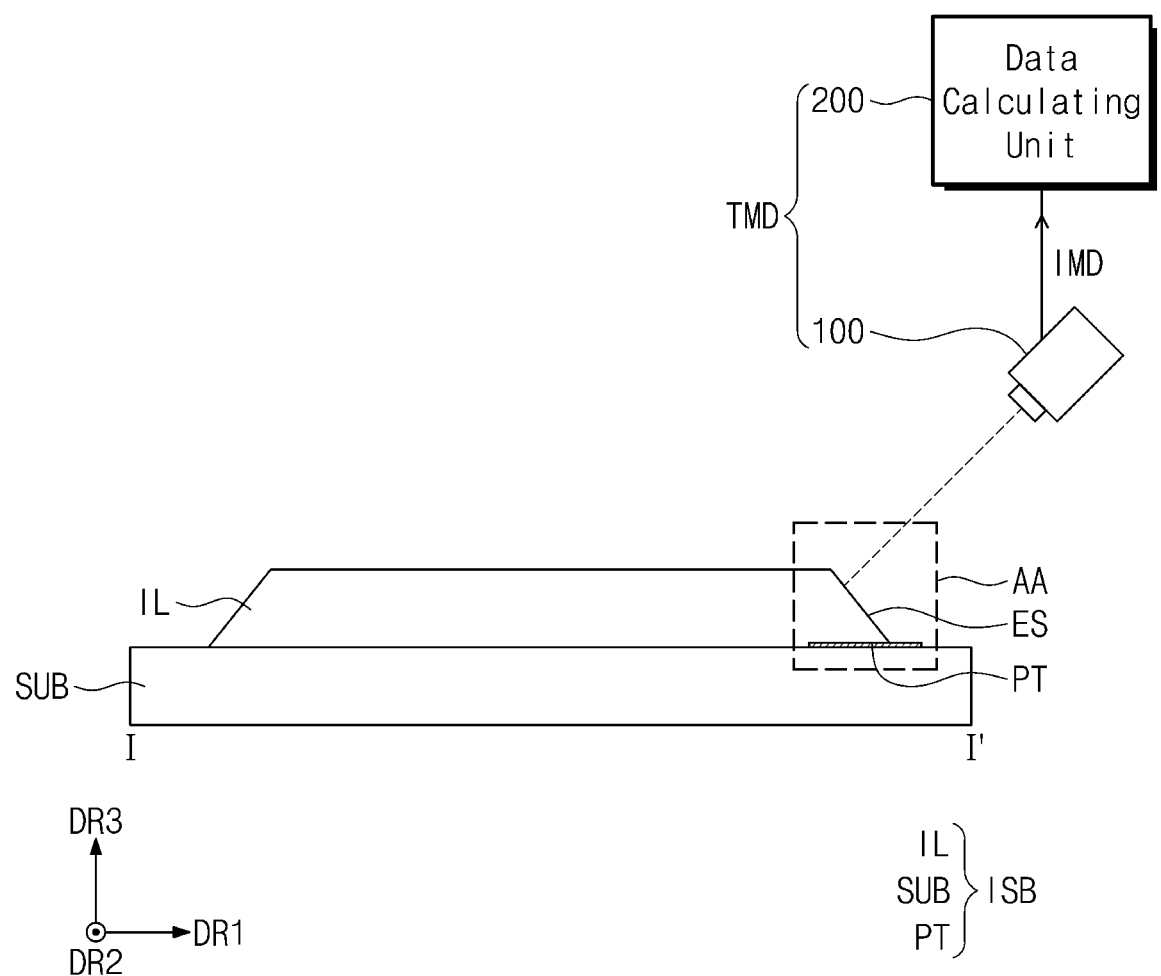
FIG. 6 is a cross-sectional view illustrating a thickness measuring device and an inspection substrate according to an embodiment.

FIG. 6 is a cross-sectional view illustrating a thickness measuring device and an inspection substrate according to an embodiment of the inventive concept. An inspection substrate ISB illustrated in FIG. 6 may correspond to a line I-I' of the inspection substrate ISB illustrated in FIG. 5B.

In an embodiment, referring to FIG. 6, a thickness measuring device TMD may include an imaging unit 100 and a data calculating unit 200. The thickness measuring device TMD may correspond to measurement devices having various shapes to measure the thickness of an inspection layer IL. The thickness measuring device TMD may image an inspection substrate ISB and measure the thickness of the inspection layer IL included in the inspection substrate ISB.

According to an embodiment, the imaging unit 100 may take an image of the inspection substrate ISB to output inspection image data IMD corresponding to the inspection substrate ISB. The imaging unit 100 may generate the inspection image data IMD obtained by imaging the inspection substrate ISB and output the inspection image data IMD to the data calculating unit 200. The inspection image data IMD may be a fluorescent (FL) and/or white light (WL) image. The imaging unit 100 may be disposed to be inclined at a fixed angle with respect to the inspection substrate ISB. Specifically, the imaging unit 100 may be disposed above the inspection substrate ISB and inclined at the fixed angle in the first direction DR1 to image an end ES of the inspection substrate ISB at the fixed angle in a lateral direction. As the imaging unit 100 is disposed inclined at the fixed angle, the inspection image data IMD of the inspection substrate ISB photographed at the fixed angle in a lateral direction of the inspection substrate ISB may well show a degree of distortion of a pattern PT. Specifically, when the imaging unit 100 is disposed above the inspection substrate ISB in a direction perpendicular to the inspection substrate ISB and photographs the inspection substrate ISB, it may be difficult to identify the degree of distortion of the pattern PT in the third direction DR3 from the inspection image data IMD. However, when the imaging unit 100 is inclined at the fixed angle with respect to the inspection substrate ISB and photographs the inspection substrate ISB at the fixed angle in the lateral direction of the inspection substrate ISB, the inspection image data IMD may be provided to three-dimensionally identify the degree of distortion of the pattern PT in the third direction DR3.

According to an embodiment, the data calculating unit 200 may receive the inspection image data IMD and calculate a thickness value of the inspection layer IL from the inspection image data IMD. The thickness value of the inspection layer IL may be calculated using a coordinate value of the pattern PT, which may be included in the inspection substrate ISB, from the inspection image data IMD. A method of calculating the thickness value of the inspection layer IL from the inspection image data IMD by the data calculating unit 200 will be described in detail later.

According to an embodiment, the end ES of the inspection substrate ISB may have an inclined surface. Specifically, the end ES of the inspection layer IL may have the inclined surface that is inclined in a direction away from a center of the inspection layer IL. A tilt angle of the inclined surface is not limited to one embodiment, and the tilt angle of the inclined surface may be formed in a range between greater than about 0° and about 90°. Although the end ES of the inspection layer IL is illustrated as having a straight inclined surface, an embodiment is not limited thereto, and the end ES of the inspection layer IL may have a curved surface and/or an unevenness shape in which several stepped portions may exist. The inspection layer IL may be made of a transparent material. For example, the inspection layer IL may be made of a transparent resin such as PC, PMMA and/or PVC, which is a light transmissive material. As the inspection layer IL is made of the transparent material, information of the pattern PT disposed below the inspection layer IL may be extracted from the inspection image data IMD photographed by the imaging unit 100. Although not illustrated, in an embodiment, an upper layer may be additionally disposed on the inspection layer IL. Like the inspection layer IL, the upper layer may be made of a transparent material that may be the light transmissive material. As the upper layer is made of the transparent material, the information of the pattern PT disposed below the inspection layer IL may be extracted from the inspection image data IMD photographed by the imaging unit 100.

Figure 7:
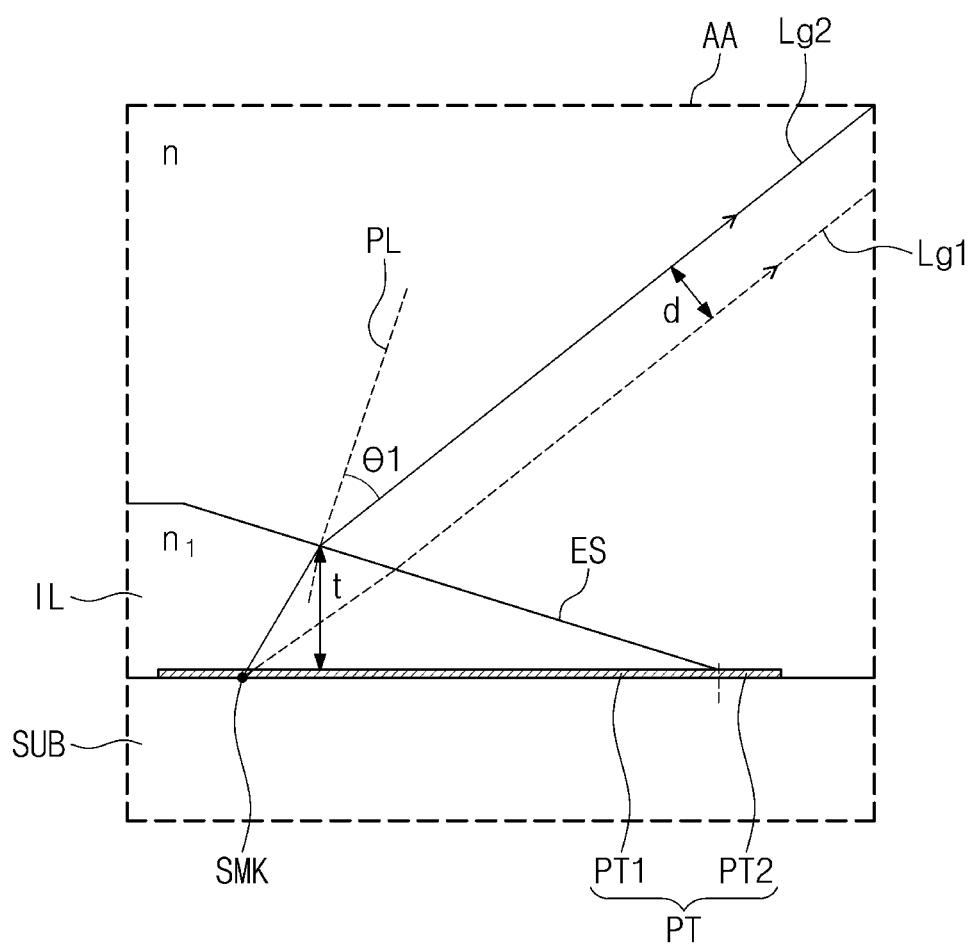
FIG. 7 is an enlarged view of region AA illustrated in FIG. 6.

FIG. 7 is an enlarged view of region AA illustrated in FIG. 6.

In an embodiment, paths of light Lg1 and Lg2 transmitted from a reference mark SMK to the imaging unit 100 (see FIG. 6) will be described using Snell's law with reference to FIG. 7. The light reflecting from the reference mark SMK is incident into the imaging unit 100 to form an image on the imaging unit 100. The first light Lg1 is light traveling from the reference mark SMK toward the imaging unit 100 when the inspection layer IL is not disposed on the substrate SUB, and the second light Lg2 is light traveling from the reference mark SMK toward the imaging unit 100 when the inspection layer IL is disposed on the substrate SUB. That is, the first light Lg1 and the second light Lg2 may travel along different paths on the basis of the reference mark SMK.

In an embodiment, the reason why the path of the first light Lg1 and the path of the second light Lg2 are different from each other is that a refractive index of the air (hereinafter referred to as an air refractive index n, where n may be, for example, 1) and a refractive index $n_1$ of the inspection layer IL are different from each other. The refractive index $n_1$ of the inspection layer IL is greater than the air refractive index n, and due to the difference between the refractive index $n_1$ of the inspection layer IL and the air refractive index n, the second light Lg2 is refracted at an interface between the inspection layer IL and the air, i.e., at the end ES, and then, travels toward the imaging unit 100. Due to the light path difference between the first light Lg1 and the second light Lg2, the thickness of the inspection layer IL may be obtained.

In an embodiment, the second light Lg2 travels according to Equation 1 for Snell's law below.

$$d = t\sin\theta_1 \left[1 - \frac{\cos\theta_1}{\sqrt{n1^2 - \sin^2\theta_1}}\right] \quad \text{[Equation 1]}$$

where t is the thickness of the inspection layer IL, d is the light path difference between the first light Lg1 and the second light Lg2, $\theta_1$ is an imaging angle of the imaging unit 100 with respect to a normal line PL to the end ES, and $n_1$ is the refractive index of the inspection layer IL. The light path difference d is magnitude corresponding to the light path difference between the first light Lg1 and the second light Lg2 traveling from the reference mark SMK, which is caused by the refractive index $n_1$ of the inspection layer IL. The light path difference d may be the light path difference between the first light Lg1 and the second light Lg2, which corresponds to a difference between a first coordinate value $(X_1, Y_1)$ (see FIG. 8B) and a second coordinate value $(X_2, Y_2)$ (see FIG. 8B) that are obtained from the inspection image data IMD photographed by the imaging unit 100. This will be described in detail with reference to FIGS. 8A and 8B.

In an embodiment, the pattern PT may include a first pattern portion PT1 overlapping the inspection layer IL and a second pattern portion PT2 non-overlapping the inspection layer IL. According to an embodiment, the first pattern portion PT1 and the second pattern portion PT2 may be formed as a single body without being separated from each other. However, an embodiment is not limited thereto, and the first pattern portion PT1 and the second pattern portion PT2 may be disposed apart from each other. The reference mark SMK may be formed on the first pattern portion PT1. On the basis of the reference mark SMK formed on the first pattern portion PT1, Equation 1 may be used to calculate the thickness t of the inspection layer IL having the end ES through which the second light Lg2 passes.

Figure 8A:
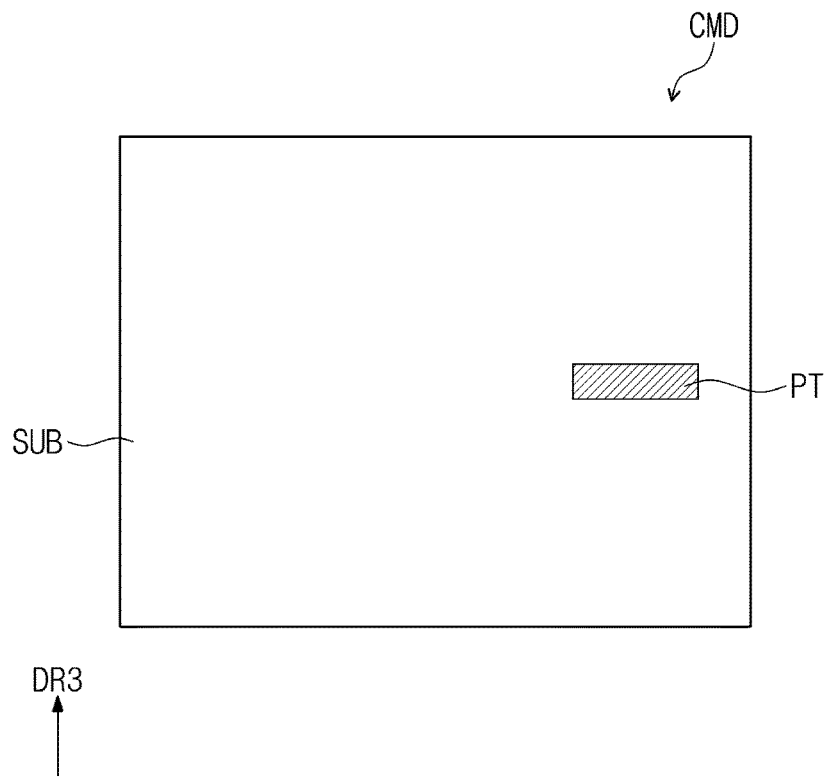
FIG. 8A is a plan view illustrating inspection image data according to an embodiment.
Figure 8B:
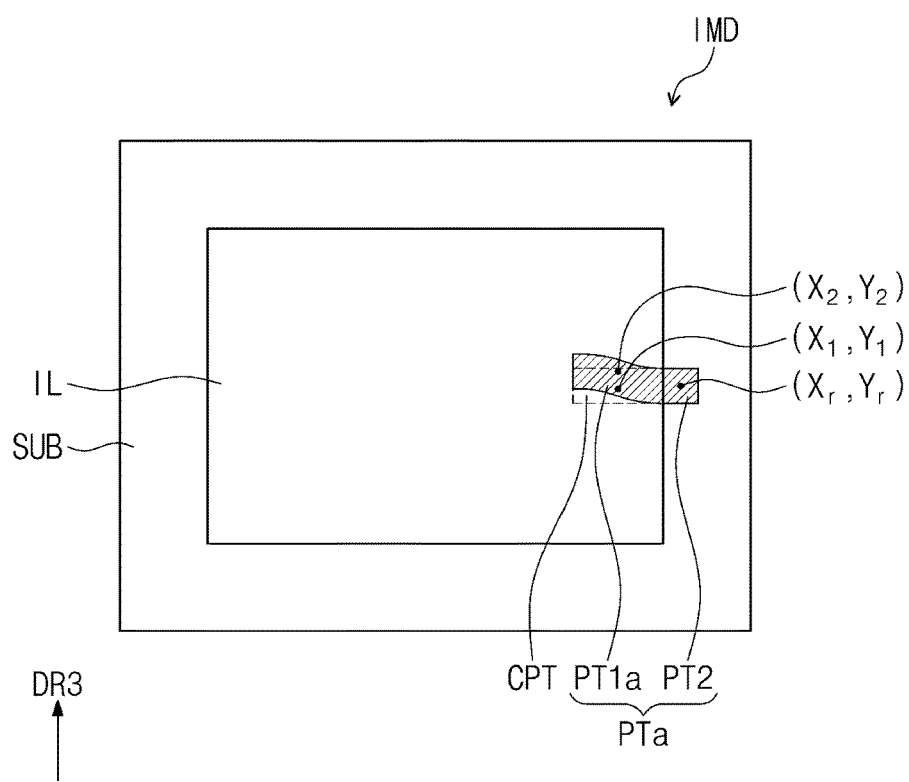
FIG. 8B is a plan view illustrating inspection image data according to an embodiment.

FIG. 8A is a view illustrating inspection image data according to an embodiment. FIG. 8B is a view illustrating inspection image data according to an embodiment. Hereinafter, an embodiment will be described with reference to FIGS. 6 to 8B.

In an embodiment, comparative image data CMD illustrated in FIG. 8A is an image corresponding to the inspection substrate ISB (see FIG. 6) and may be based on an assumption that an inspection layer IL is not disposed on a substrate SUB. Referring to FIG. 8A, a pattern PT may be disposed overlapping the substrate SUB, where the pattern PT may be formed in the form of a bar having a rectangular shape and is not distorted as illustrated in FIG. 5A.

In an embodiment, inspection image data IMD illustrated in FIG. 8B is an image corresponding to the inspection substrate ISB when the inspection layer IL is disposed on the substrate SUB. Referring to FIG. 8B, a pattern PTa may be illustrated in the inspection image data IMD and may include a first pattern portion PT1a overlapping the inspection layer IL and a second pattern portion PT2 non-overlapping the inspection layer IL. A comparative pattern CPT is an image in which the first pattern portion PT1a is formed when the inspection layer IL is not disposed as illustrated in FIG. 8A. A first coordinate value $(X_1, Y_1)$ when the inspection layer IL is absent may be defined in the comparative pattern CPT. Specifically, the first coordinate value $(X_1, Y_1)$ may be defined as a coordinate value corresponding to a central portion of the comparative pattern CPT. A second coordinate value $(X_2, Y_2)$ when the inspection layer IL is present may be defined in the first pattern portion PT1a. Specifically, the second coordinate value $(X_2, Y_2)$ may be defined as a coordinate value corresponding to a central portion of the first pattern portion PT1a. A reference coordinate value $(X_r, Y_r)$ may be defined in the second pattern portion PT2. Specifically, the reference coordinate value $(X_r, Y_r)$ may be defined as a coordinate value corresponding to a central portion of the second pattern portion PT2.

In an embodiment, it may be confirmed that the first pattern portion PT1a illustrated in the inspection image data IMD is formed distorted in the third direction DR3, when compared to the comparative pattern CPT based on the assumption that the inspection layer IL is not disposed on the substrate SUB. Specifically, the first pattern portion PT1a may be formed corresponding to the end ES, illustrated in FIG. 6, and bent in the third direction DR3. As described above, this is because the air refractive index n and the refractive index $n_1$ of the inspection layer IL are different from each other. That is, due to the height according to the end ES of the inspection layer IL and the refractive index $n_1$ of the inspection layer IL, the image may be generated like the first pattern portion PT1a is bent in the third direction DR3 as illustrated in FIG. 8B. According to that illustrated, the first pattern portion PT1a and the second pattern portion PT2 are connected as a single body without being separated from each other. However, an image may be generated which looks like the first pattern portion PT1a and the second pattern portion PT2 being separated from each other according to the height of the end ES of the inspection layer IL and/or a difference between the refractive index $n_1$ of the inspection layer IL and/or the air refractive index n.

According to an embodiment, the first coordinate value $(X_1, Y_1)$ may be calculated from the reference coordinate value $(X_r, Y_r)$. Referring to FIG. 6, the pattern PT has a bar shape extending in the first direction DR1. The data calculating unit 200 may infer the shape of the second pattern portion PT2 from the inspection image data IMD obtained from the imaging unit 100, and the shape of the pattern PT based on the assumption that the inspection layer IL is not disposed, from the reference coordinate value $(X_r, Y_r)$ of the second pattern portion PT2, and calculate the first coordinate value $(X_1, Y_1)$ of the comparative pattern CPT. That is, the data calculating unit 200 may obtain the first coordinate value $(X_1, Y_1)$ and the second coordinate value $(X_2, Y_2)$ and measure the thickness t of the inspection layer IL illustrated in FIG. 7 using Equation 2 below:

$$t = \frac{d}{\sin\theta_1 \left[1 - \frac{\cos\theta_1}{\sqrt{n1^2 - \sin^2\theta_1}}\right]} \quad \text{[Equation 2]}$$

The thickness measuring device TMD according to an embodiment may use the imaging unit 100, which is inclined at the fixed angle with respect to the inspection substrate ISB, to image the end ES of the inspection substrate ISB at the fixed angle in the lateral direction, and obtain the second coordinate value $(X_2, Y_2)$ of the first pattern portion PT1, which may be distorted by the refractive index $n_1$ of the inspection layer IL, from the inspection image data IMD corresponding to the imaged inspection substrate ISB. In addition, the thickness t of the inspection layer IL may be measured through Equation 2. As it is possible to measure the thickness t of the inspection layer IL by using one-time imaging, processing for measuring the thickness t of the inspection layer IL may be simplified, and costs required for measurement of the thickness t of the inspection layer IL may be reduced.

Figure 9A:
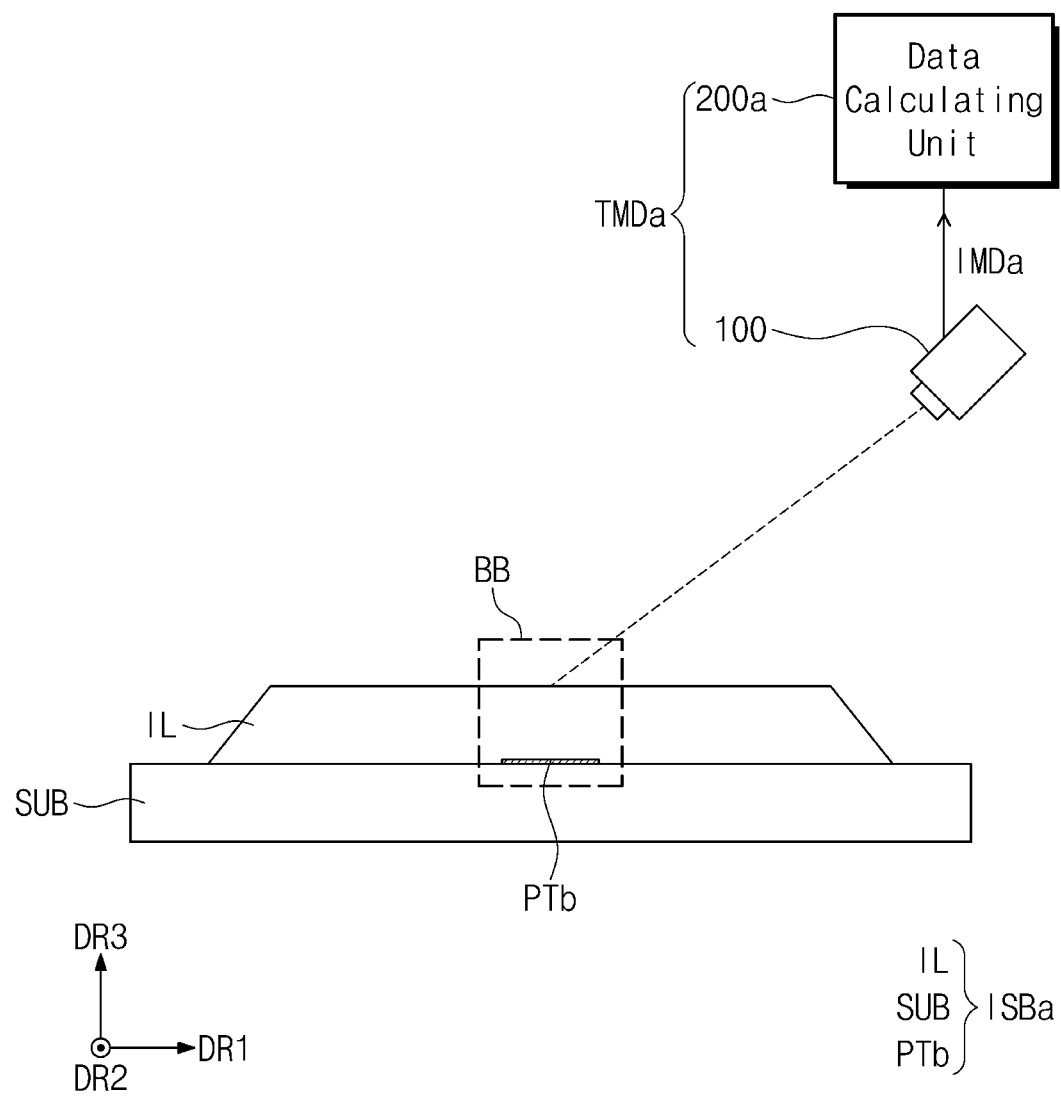
FIG. 9A is a cross-sectional view illustrating a thickness measuring device and an inspection substrate according to an embodiment.
Figure 9B:
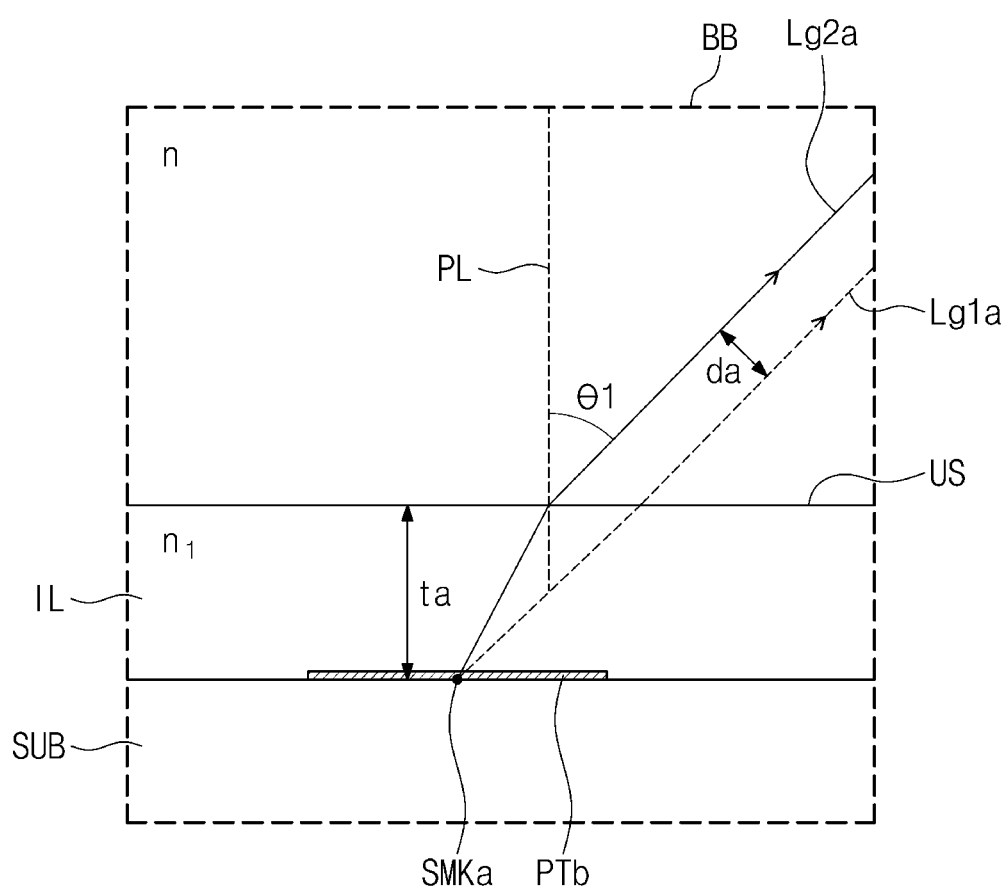
FIG. 9B is an enlarged view of region BB illustrated in FIG. 9A.

FIG. 9A is a cross-sectional view illustrating a thickness measuring device and an inspection substrate according to an embodiment. FIG. 9B is an enlarged view of a region BB illustrated in FIG. 9A. Hereinafter, description of the matters described above will be omitted to avoid redundancy.

In an embodiment and referring to FIG. 9A, a thickness measuring device TMDa may include an imaging unit 100 and a data calculating unit 200a. The imaging unit 100 may be disposed inclined at a fixed angle with respect to an inspection substrate ISBa. Specifically, the imaging unit 100 may be disposed above the inspection substrate ISBa and inclined at the fixed angle in the first direction DR1 so as to image a central portion of the inspection substrate ISBa at the fixed angle in a lateral direction.

A pattern PTb may overlap the central portion of the inspection layer IL. That is, as the pattern PTb is disposed to overlap the central portion of the inspection layer IL, the thickness measuring device TMDa may measure the thickness of the central portion of the inspection layer IL, at which the pattern PTb is formed.

In an embodiment and referring to FIG. 9B, light reflecting from a reference mark SMKa is incident into the imaging unit 100 to form an image on the imaging unit 100. First light Lg1a is light traveling from the reference mark SMKa toward the imaging unit 100 when the inspection layer IL is not disposed on a substrate SUB, and second light Lg2a is light traveling from the reference mark SMKa toward the imaging unit 100 when the inspection layer IL is disposed on the substrate SUB. That is, the first light Lg1a and the second light Lg2a may travel along different paths on the basis of the reference mark SMKa.

In an embodiment, the second light Lg2a travels according to Equation 3 for Snell's law below:

$$da = t a \cdot \sin\theta_1 \left[ 1 - \frac{\cos\theta_1}{\sqrt{n1^2 - \sin^2\theta_1}} \right], \quad \text{[Equation 3]}$$

where to is the thickness of the inspection layer IL, da is a light path difference between the first light Lg1a and the second light Lg2a, θ1 is an imaging angle of the imaging unit 100 with respect to a normal line PL to a top surface US, and $n_1$ is a refractive index of the inspection layer IL. The light path difference da is a magnitude corresponding to the light path difference between the first light Lg1a and the second light Lg2a traveling from the reference mark SMKa, which is caused by the refractive index $n_1$ of the inspection layer IL. The light path difference da may be the light path difference between the first light Lg1a and the second light Lg2a, which corresponds to a difference between a first coordinate value $(X_{1a}, Y_{1a})$ (see FIG. 10B) and a second coordinate value $(X_{2a}, Y_{2a})$ (see FIG. 10B) that is obtained from inspection image data IMD photographed by the imaging unit 100. This will be described in detail with reference to FIGS. 10A and 10B.

Figure 10A:
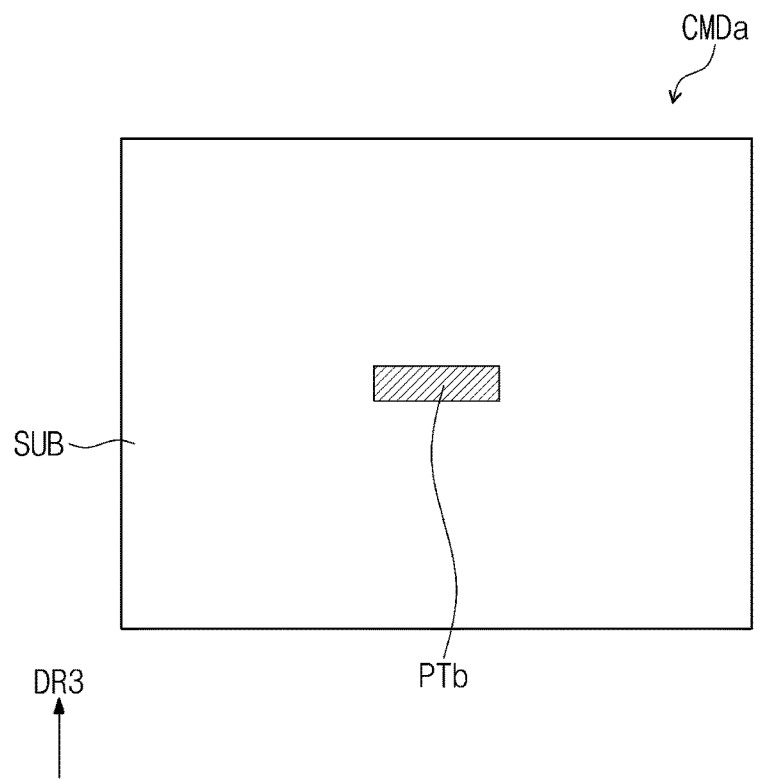
FIG. 10A is a plan view illustrating inspection image data according to an embodiment.
Figure 10B:
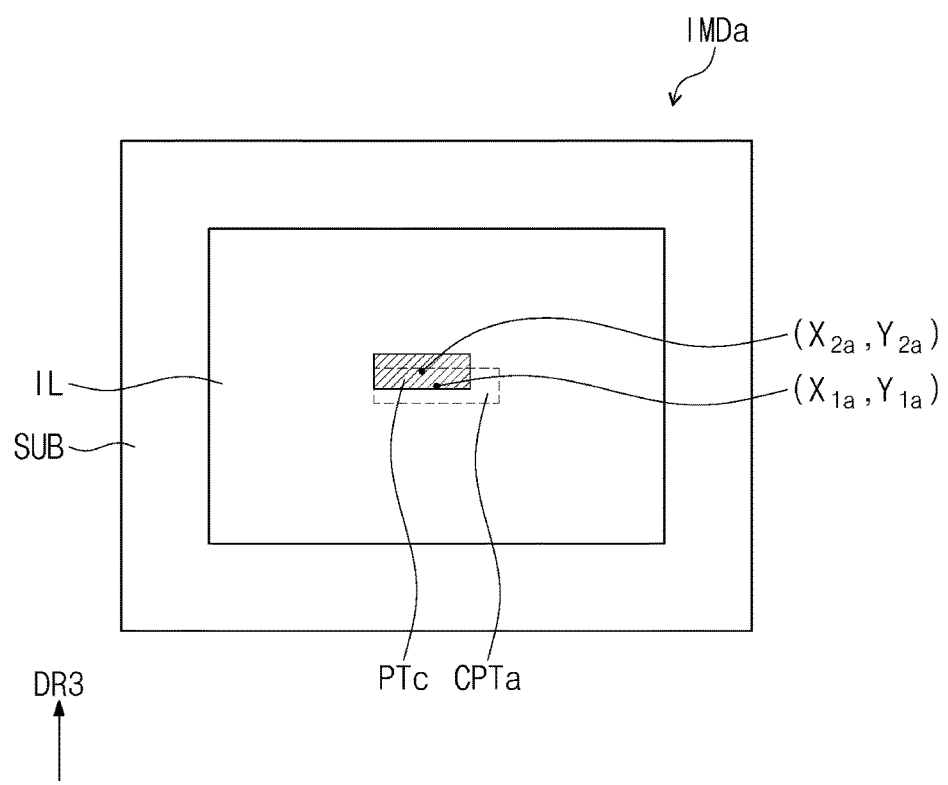
FIG. 10B is a plan view illustrating inspection image data according to an embodiment.

FIG. 10A is a view illustrating comparative image data according to an embodiment. FIG. 10B is a view illustrating inspection image data according to an embodiment. Hereinafter, an embodiment will be described with reference to FIGS. 9A to 10B.

According to an embodiment, comparative image data CMDa illustrated in FIG. 10A is an image corresponding to the inspection substrate ISBa (see FIG. 9A) based on an assumption that an inspection layer IL is not disposed on a substrate SUB. Referring to FIG. 10A, a pattern PTb may be disposed overlapping a central portion of the substrate SUB. As illustrated in FIG. 10A, the pattern PTb is formed in the form of a bar having a rectangular shape and is not distorted.

In an embodiment, inspection image data IMDa illustrated in FIG. 10B is an image corresponding to the inspection substrate ISBa when the inspection layer IL is disposed on the substrate SUB. Referring to FIG. 10B, a pattern PTc and a comparative pattern CPTa are illustrated. As illustrated in FIG. 10A, the comparative pattern CPTa is an image in which the pattern PTc is formed when the inspection layer IL is not disposed. A first coordinate value $(X_{1a}, Y_{1a})$ when the inspection layer IL is absent may be defined in the comparative pattern CPTa. Specifically, the first coordinate value $(X_{1a}, Y_{1a})$ may be defined as a coordinate value corresponding to a central portion of the comparative pattern CPTa. A second coordinate value $(X_{2a}, Y_{2a})$ when the inspection layer IL is present may be defined in the pattern PTc. Specifically, the second coordinate value $(X_{2a}, Y_{2a})$ may be defined as a coordinate value corresponding to the central portion of the pattern PTc.

In an embodiment, the pattern PTc illustrated in the inspection image data IMDa may be distorted in the third direction DR3, when compared to the comparative pattern CPTa based on the assumption that the inspection layer IL is not disposed on the substrate SUB. This is because an air refractive index n and a refractive index $n_1$ of the inspection layer IL are different from each other. That is, as the imaging is performed at the fixed angle in the lateral direction, an image of the pattern PTc moving in the third direction DR3 and different in size as illustrated in FIG. 10B may be generated by the refractive index $n_1$ of the inspection layer IL.

According to an embodiment, the first coordinate value $(X_{1a}, Y_{1a})$ may be calculated from preliminarily imaging the comparative pattern CPTa by the imaging unit 100 before the inspection layer IL is disposed. By imaging the comparative pattern CPTa before the inspection layer IL is disposed, the first coordinate value $(X_{1a}, Y_{1a})$ may be calculated from the image, and then the disposing of the inspection layer IL may be performed. Thereafter, the data calculating unit 200a may calculate the second coordinate value $(X_{2a}, Y_{2a})$ from the inspection image data IMDa obtained by imaging the inspection substrate ISBa by the imaging unit 100, and then calculate a thickness ta of the inspection layer IL from the first coordinate value $(X_{1a}, Y_{1a})$ and the second coordinate value $(X_{2a}, Y_{2a})$. The data calculating unit 200a may measure the thickness ta of the inspection layer IL illustrated in FIG. 9B through Equation 4 below:

$$ta = \frac{da}{\sin\theta_1 \left[ 1 - \frac{\cos\theta_1}{\sqrt{n1^2 - \sin^2\theta_1}} \right]}, \quad \text{[Equation 4]}$$

The thickness measuring device TMDa according to an embodiment may use the imaging unit 100 inclined at a fixed angle with respect to the inspection substrate ISBa to preliminarily image a central portion of the inspection substrate ISBa at the fixed angle in a lateral direction before the inspection layer IL is disposed, and calculate the first coordinate value $(X_{1a}, Y_{1a})$ from the imaged comparative image data CMDa. Thereafter, the thickness ta of the inspection layer IL may be measured using Equation 4 from the second coordinate value $(X_{2a}, Y_{2a})$ calculated by disposing the inspection layer IL and imaging the central portion of the inspection substrate ISBa at the fixed angle in the lateral direction. As it is possible to measure the thickness ta of the inspection layer IL as a whole through the preliminarily imaging and the imaging, processing for measuring the thickness ta of the inspection layer IL may be simplified and costs required for measurement the thickness ta of the inspection layer IL may be reduced.

Figure 11:
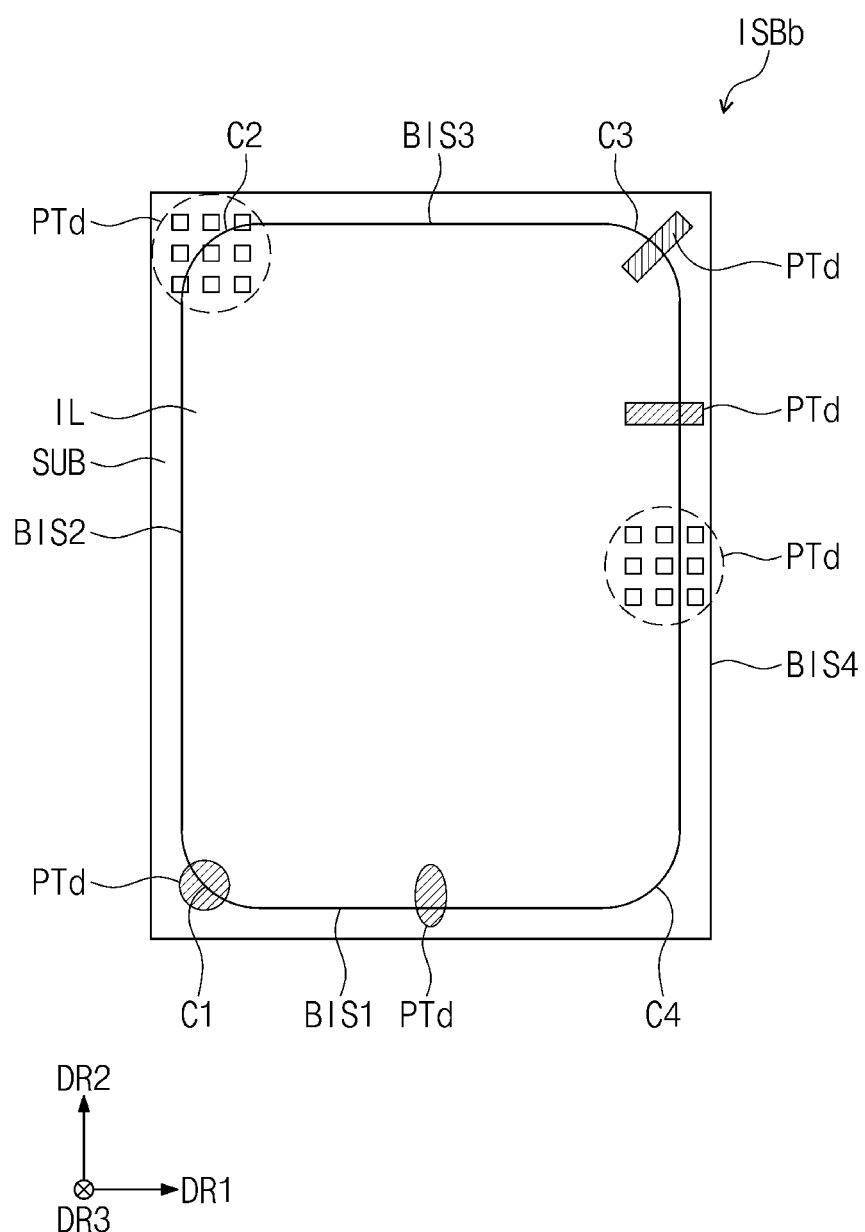
FIG. 11 is a plan view of an inspection substrate according to an embodiment.

FIG. 11 is a plan view of an inspection substrate according to an embodiment.

In an embodiment, referring to FIG. 11, the inspection substrate may include an inspection layer IL, a substrate SUB, and a pattern PTd. The pattern PTd may be provided in plurality. According to an embodiment, the plurality of patterns PTd may have different shapes. As illustrated, the plurality of patterns PTd may have a rectangular bar shape, a grid shape, and/or a circular shape. However, the shapes of the plurality of patterns PTd are not limited thereto. The plurality of patterns PTd may be formed partially overlapping the inspection layer IL. However, an embodiment is not limited thereto, and some of the plurality of patterns PTd may be formed entirely overlapping the inspection layer IL.

The inspection layer IL may include first, second, third and fourth side surfaces BIS1, BIS2, BIS3 and BIS4, respectively. The first side surface BIS1 is formed in a direction that is parallel to the first direction DR1, and the third side surface BIS3 is formed in a direction that is parallel to the first direction DR1. The third side surface BIS3 is spaced apart from the first side surface BIS1 in the second direction DR2 crossing the first direction DR1. The second side surface BIS2 is formed in a direction that is parallel to the second direction DR2, and the fourth side surface BIS4 is formed in a direction parallel to the second direction DR2. The fourth side surface BIS4 is spaced apart from the second side surface BIS2 in the first direction DR1.

According to an embodiment, at least one of the first, second, third or fourth side surface BIS1, BIS2, BIS3 or BIS4, respectively, may have an inclined surface that is inclined in a direction away from a center of the inspection layer IL. Two opposing side surfaces may have inclined surfaces, respectively, as illustrated in FIG. 6. However, an embodiment is not limited thereto, and all or some of the first, second, third and fourth side surfaces BIS1, BIS2, BIS3 and BIS4, respectively, may have inclined surfaces, respectively.

In an embodiment, the plurality of patterns PTd may overlap at least one of the first, second, third or fourth side surface BIS1, BIS2, BIS3 or BIS4, respectively. As the plurality of patterns PTd are formed overlapping the first, second, third or fourth side surface BIS1, BIS2, BIS3 or BIS4, respectively, as illustrated, a portion overlapping the inspection layer IL and a portion non-overlapping the inspection layer IL may be included. The portion overlapping the inspection layer IL and the portion non-overlapping the inspection layer IL may correspond to the first pattern portion PT1 and the second pattern portion PT2, respectively, which are illustrated in FIG. 7A.

In an embodiment, the inspection layer IL may further include first, second, third and fourth corner portions C1, C2, C3 and C4, respectively. The first corner portion C1 may be formed between the first side surface BIS1 and the second side surface BIS2, the second corner portion C2 may be formed between the second side surface BIS2 and the third side surface BIS3, the third corner portion C3 may be formed between the third side surface BIS3 and the fourth side surface BIS4, and the fourth corner portion C4 may be formed between the fourth side surface BIS4 and the first side surface BIS1. The first, second, third and fourth corner portions C1, C2, C3 and C4, respectively, may each have a predetermined curvature. As the first, second, third and fourth corner portions C1, C2, C3 and C4, respectively, each have the predetermined curvature, the first, second, third and fourth corner portions C1, C2, C3 and C4, respectively, may each have a curved shape.

According to an embodiment, at least one of the first, second, third or fourth corner portion C1, C2, C3 or C4, respectively, may have an inclined surface that is inclined in the direction away from the central portion of the inspection layer IL. However, an embodiment is not limited thereto, and all of the first, second, third and fourth corner portions C1, C2, C3 and C4, respectively, may have inclined surfaces.

In an embodiment, the plurality of patterns PTd may overlap at least one of the first, second, third or fourth corner portion C1, C2, C3 or C4, respectively. As the plurality of patterns PTd are formed overlapping the first, second, third or fourth corner portion C1, C2, C3 or C4, respectively, as illustrated, a portion overlapping the inspection layer IL and a portion non-overlapping the inspection layer IL may be included. The portion overlapping the inspection layer IL and the portion non-overlapping the inspection layer IL may correspond to the first pattern portion PT1 and the second pattern portion PT2, respectively, which are illustrated in FIG. 7A.

Figure 12A:
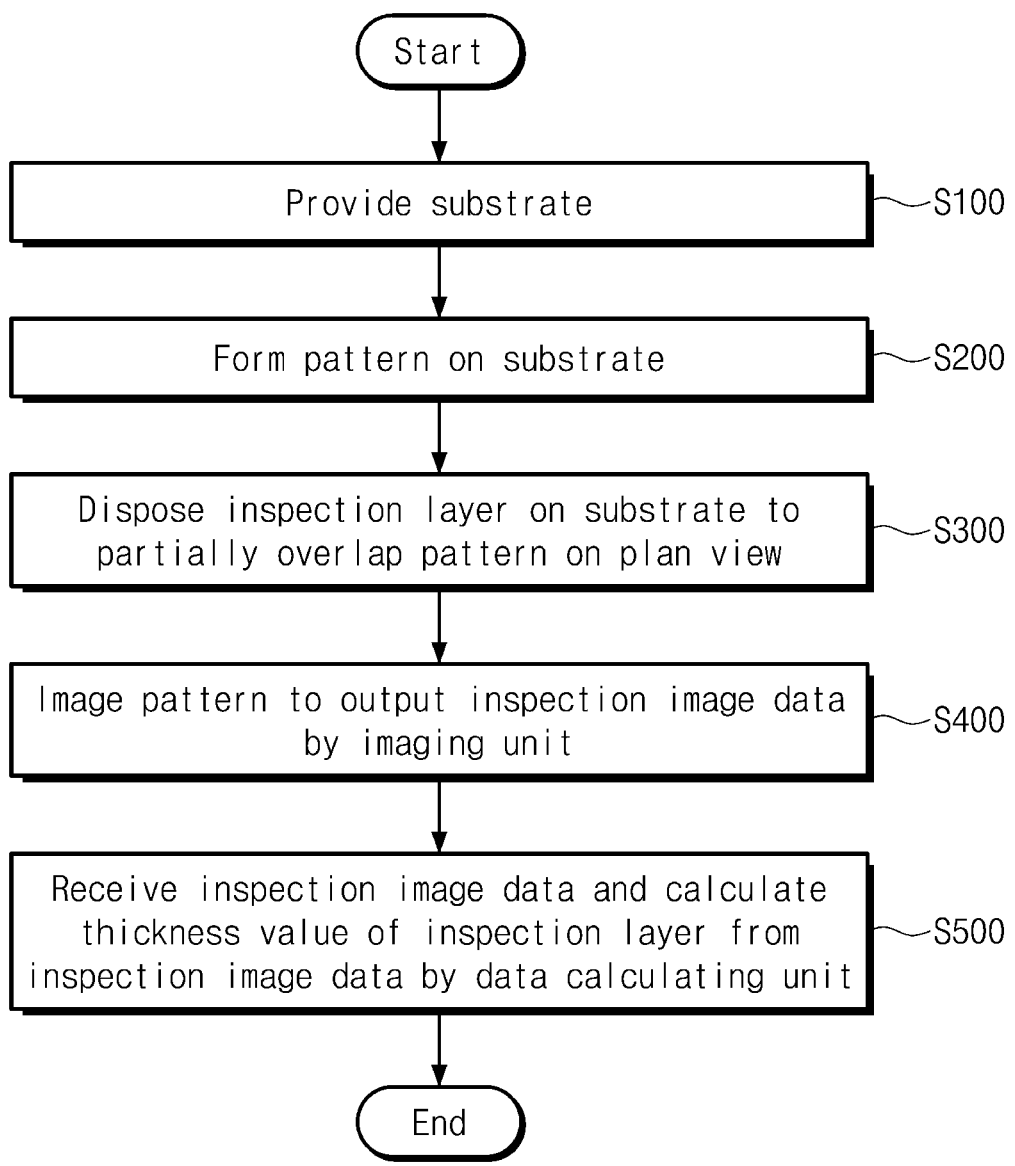
FIG. 12A is a flowchart of a thickness measuring method according to an embodiment.
Figure 12B:
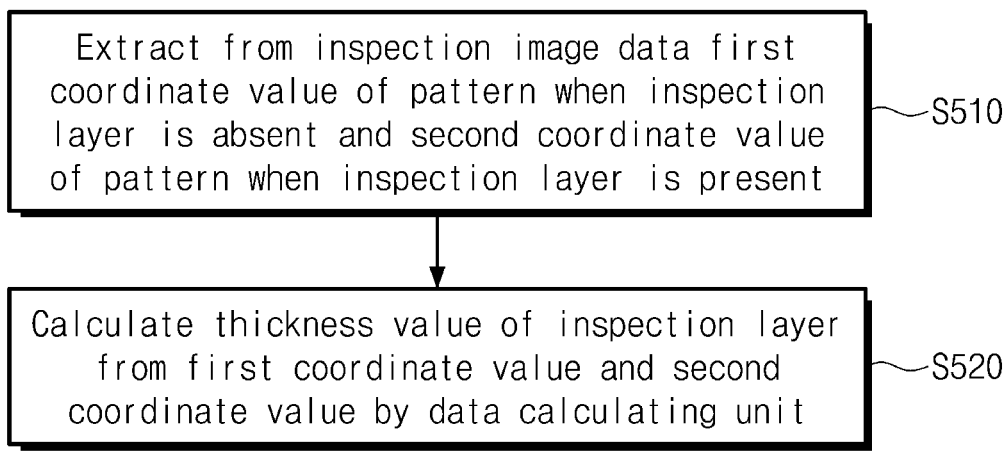
FIG. 12B is a flowchart of a thickness measuring method according to an embodiment.
Figure 12C:
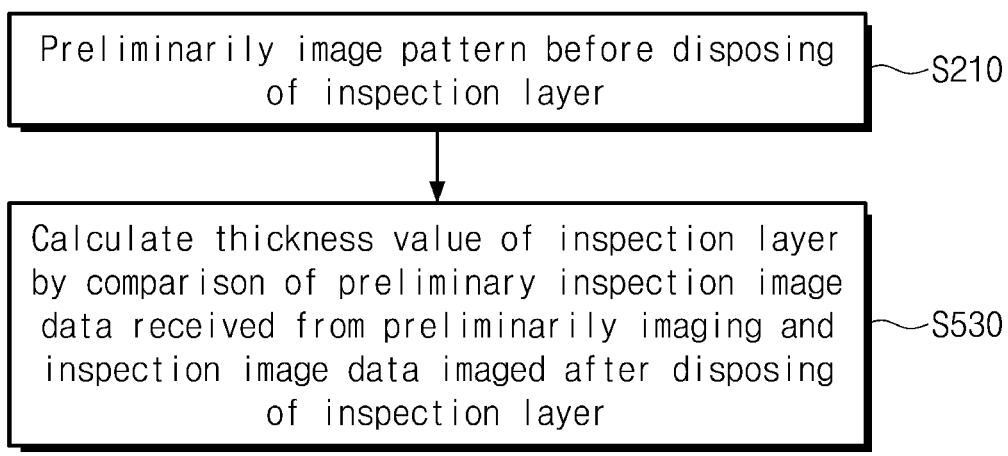
FIG. 12C is a flowchart of a thickness measuring method according to an embodiment.

FIGS. 12A to 12C are flowcharts of a thickness measuring method according to an embodiment.

In an embodiment and referring to FIGS. 5A and 12A, a substrate SUB may be provided (S100) and, a pattern PT may be formed on the substrate SUB (S200). The pattern PT may be formed on the substrate SUB to overlap the substrate SUB, and formed in a rectangular bar shape according to that illustrated. However, an embodiment is not limited thereto. The pattern PT may have a predetermined color so as to be easily imaged later, and may be formed using an inkjet technique. Referring to FIGS. 5B and 12A, an inspection layer IL may be disposed on the substrate SUB to partially overlap the pattern PT (S300). The inspection layer IL may be disposed on the substrate SUB to overlap a portion of the substrate SUB.

In an embodiment and referring to FIGS. 6 and 12A, an imaging unit 100 may image an inspection substrate ISB and output inspection image data IMD. Specifically, the imaging unit 100 may image the pattern PT included in the inspection substrate ISB and output the inspection image data IMD to a data calculating unit 200 (S400). As illustrated, the imaging unit 100 may be disposed to be inclined at a fixed angle with respect to the inspection substrate ISB. Accordingly, the imaging unit 100 may image the inspection substrate ISB at the fixed angle in a lateral direction.

In an embodiment and referring to FIGS. 6 and 12A, the data calculating unit 200 may receive the inspection image data IMD and calculate a thickness value of the inspection layer IL from the inspection image data IMD (S500). The thickness value of the inspection layer IL may be calculated using a coordinate value of the pattern PT, which may be included in the inspection substrate ISB, from the inspection image data IMD.

Specifically, In an embodiment and referring to FIGS. 8B and 12B, the calculating of the thickness value of the inspection layer IL may include extracting, from the inspection image data IMD, a first coordinate value $(X_1, Y_1)$ of a pattern PT when the inspection layer IL is absent, and a second coordinate value $(X_2, Y_2)$ of the pattern PT when the inspection layer IL is present (S510), and calculating the thickness value of the inspection layer IL from the first coordinate value $(X_1, Y_1)$ and the second coordinate value $(X_2, Y_2)$ by the data calculating unit 200 (S520).

In an embodiment, the data calculating unit 200 may infer the shape of the pattern PT based on an assumption that the inspection layer IL is not disposed, from the inspection image data IMD obtained from the imaging unit 100, and may calculate the first coordinate value $(X_1, Y_1)$ of the pattern PT. The data calculating unit 200 may calculate the thickness of the inspection layer IL using Equation 2 together with the second coordinate value $(X_2, Y_2)$ of the pattern PT from the inspection image data IMD.

In an embodiment and referring to FIGS. 9A, 10B and 12C, preliminarily imaging a pattern PTb (S210) may be further included before the inspection layer IL is disposed. By imaging the pattern PTb before the inspection layer IL is disposed, a first coordinate value $(X_{1a}, Y_{1a})$ may be calculated from the imaged image, and then the disposing of the inspection layer IL may be performed. Thereafter, the data calculating unit 200 may calculate the thickness value of the inspection layer IL by comparing preliminary inspection image IMDb, which is received from the preliminarily imaging, and inspection image data IMDa imaged after the inspection layer IL is disposed (S530). Specifically, the second coordinate value $(X_{2a}, Y_{2a})$ may be calculated from the inspection image data IMDa obtained by imaging the inspection substrate ISB by a data imaging unit 100a, and the thickness to of the inspection layer IL may be calculated through Equation 4 by comparing the first coordinate value $(X_{1a}, Y_{1a})$ and the second coordinate value $(X_{2a}, Y_{2a})$.

According to an embodiment, the thickness measuring device may measure the thickness of the inspection layer from the image obtained by photographing the pattern included in the inspection substrate. Specifically, the imaging unit inclined at the fixed angle with respect to the inspection substrate may be used to photograph the pattern overlapping the inspection layer on a plan view, and the thickness of the inspection layer may be measured using the coordinate value of the pattern distorted by the refractive index of the inspection layer. Consequently, the processing for measuring the thickness may be simplified and the costs required for measurement the thickness may be reduced.

Although the embodiments of the invention have been described, it is understood that the present invention should not be limited to these embodiments but various changes and modifications can be made by one ordinary skilled in the art within the spirit and scope of the present invention as hereinafter claimed. Moreover, embodiments or parts of embodiments may be combined in whole or in part without departing from the scope of the invention.

Therefore, the technical scope of the inventive concept is not limited to the contents described in the detailed description of the specification, but should be determined by the claims.

What is claimed is:

1. A thickness measuring device comprising:
an imaging unit disposed above an inspection substrate, wherein the inspection substrate includes a substrate, a pattern provided on the substrate, and an inspection layer disposed on the pattern, wherein the imaging unit images the inspection substrate to output inspection image data; and
a data calculating unit connected to the imaging unit to receive the inspection image data and calculate a thickness value of the inspection layer from the inspection image data,
wherein the imaging unit is disposed to be inclined at a fixed angle with respect to the inspection substrate, and
wherein the data calculating unit calculates the thickness value of the inspection layer using a coordinate value of the pattern from the inspection image data.

2. The thickness measuring device of claim 1, wherein the inspection layer includes first to fourth side surfaces,
wherein at least one of the first to fourth side surfaces has an inclined surface that is inclined in a direction away from a center of the inspection layer.

3. The thickness measuring device of claim 2, wherein the pattern overlaps at least one of the first to fourth side surfaces.

4. The thickness measuring device of claim 1, wherein the inspection layer includes first to fourth corner portions,
wherein at least one of the first to fourth corner portions has an inclined surface that is inclined in a direction away from a center of the inspection layer.

5. The thickness measuring device of claim 4, wherein the pattern overlaps at least one of the first to fourth corner portions.

6. The thickness measuring device of claim 1, wherein the inspection layer is constructed from a transparent material.

7. The thickness measuring device of claim 1, wherein the pattern includes a plurality of patterns.

8. The thickness measuring device of claim 7, wherein the plurality of patterns have different shapes.

9. The thickness measuring device of claim 1, wherein the pattern overlaps a central portion of the inspection layer.

10. The thickness measuring device of claim 1, wherein the inspection layer overlaps a portion of the substrate.

11. The thickness measuring device of claim 10, wherein the pattern includes:
a first pattern portion overlapping the inspection layer; and
a second pattern portion non-overlapping the inspection layer.

12. The thickness measuring device of claim 11, wherein the first pattern portion extends from the second pattern portion.

13. The thickness measuring device of claim 1, wherein the data calculating unit calculates the thickness value of the inspection layer from a first coordinate value of the pattern when the inspection layer is absent, and a second coordinate value of the pattern when the inspection layer is present.

14. The thickness measuring device of claim 13, wherein the data calculating unit calculates the thickness of the inspection layer using the following equation:

$$t = \frac{d}{\sin\theta 1 \left[1 - \frac{\cos\theta 1}{\sqrt{n1^2 - \sin^2\theta 1}}\right]},$$

where t is a thickness of the inspection layer, d is a light path difference corresponding to a difference between the first coordinate value and the second coordinate value, θ1 is an imaging angle, and $n_1$ is a refractive index of the inspection layer.

15. A thickness measuring method, the method comprising:
providing a substrate;
forming a pattern on the substrate;
disposing an inspection layer on the substrate to partially overlap the pattern;
imaging the pattern via an imaging unit to output inspection image data; and
receiving the inspection image data via a data calculating unit; and calculating
a thickness value of the inspection layer from the inspection image data via the data calculating unit,
wherein the imaging unit is disposed to be inclined at a fixed angle with respect to the substrate.

16. The method of claim 15, wherein, the calculating a thickness value includes extracting a first coordinate value of the pattern when the inspection layer is absent, extracting a second coordinate value of the pattern when the inspection layer is present are extracted from the inspection image data, and calculating the thickness value of the inspection layer from the first coordinate value and the second coordinate value by the data calculating unit.

17. The method of claim 16, wherein the extracting the second coordinate value includes processing the first coordinate value to extract the second coordinate value from the first coordinate value.

18. The method of claim 17, wherein the calculating a thickness value includes calculating the thickness value of the inspection layer from the following equation:

$$t = \frac{d}{\sin\theta 1 \left[1 - \frac{\cos\theta 1}{\sqrt{n1^2 - \sin^2\theta 1}}\right]},$$

where t is a thickness of the inspection layer, d is a light path difference corresponding to a difference between the first coordinate value and the second coordinate value, θ1 is an imaging angle, and $n_1$ is a refractive index of the inspection layer.

19. The method of claim 15, further comprising preliminarily imaging the pattern before disposing an inspection layer.

20. The method of claim 19, wherein the calculating a thickness value includes comparing preliminary inspection image data obtained from the preliminarily imaging with inspection image data imaged after the disposing the inspection layer to calculate the thickness value of the inspection layer.

* * * * *